United States Patent
Myoren et al.

(10) Patent No.: US 10,247,109 B2
(45) Date of Patent: Apr. 2, 2019

(54) 2-SHAFT GAS TURBINE, AND THE CONTROL METHOD OF OPENING DEGREE OF INLET GUIDE VANE OF THE GAS TURBINE

(71) Applicant: MITSUBISHI HITACHI POWER SYSTEMS, LTD., Yokohama (JP)

(72) Inventors: Chihiro Myoren, Yokohama (JP); Kenji Nanataki, Yokohama (JP); Yasuo Takahashi, Yokohama (JP); Kota Kawamura, Yokohama (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 266 days.

(21) Appl. No.: 15/417,743

(22) Filed: Jan. 27, 2017

(65) Prior Publication Data
US 2017/0284308 A1    Oct. 5, 2017

(30) Foreign Application Priority Data

Mar. 29, 2016    (JP) ................... 2016-064976

(51) Int. Cl.
*F02C 9/20*      (2006.01)
*F02C 9/28*      (2006.01)
(Continued)

(52) U.S. Cl.
CPC .......... *F02C 9/20* (2013.01); *F02C 3/10* (2013.01); *F02C 9/28* (2013.01); *F02C 9/54* (2013.01);
(Continued)

(58) Field of Classification Search
CPC ...... F02C 9/20; F02C 9/22; F02C 9/28; F02C 9/54; F02C 3/10
See application file for complete search history.

(56) References Cited

U.S. PATENT DOCUMENTS 3,973,391 A * 8/1976 Reed .................... F01K 23/105
60/794
4,159,625 A * 7/1979 Kerr ........................ F02K 1/17
60/204
(Continued)

FOREIGN PATENT DOCUMENTS

CN    104213987 A    12/2014
CN    104487678 A    4/2015
(Continued)

OTHER PUBLICATIONS

Chinese Office Action dated Jul. 13, 2018 for the Chinese Patent Application No. 201710062853.1.
(Continued)

*Primary Examiner* — Todd E Manahan
*Assistant Examiner* — Eric Linderman
(74) *Attorney, Agent, or Firm* — Volpe and Koenig, P.C.

(57) ABSTRACT

A 2-shaft gas turbine has a controller which controls the opening degree of an air inlet guide vane to adjust the inlet mass flow rate to a compressor. The air inlet guide vane control unit includes a first control unit that adjusts the opening degree of the inlet guide vane to keep the speed of a high pressure turbine shaft constant; a control status confirmation unit that confirms the actual speed and the opening degree of the inlet guide vane; and a low ambient temperature correction unit that reduces the actual speed in a case where the actual speed is equal to or greater than a predetermined threshold value, the opening degree of the inlet guide vane is equal to or greater than a predetermined threshold value, and the ambient temperature is equal to or less than a predetermined threshold value.

11 Claims, 11 Drawing Sheets

(51) Int. Cl.
*F02C 9/54* (2006.01)
*F02C 3/10* (2006.01)
*F02C 9/22* (2006.01)

(52) U.S. Cl.
CPC .......... *F02C 9/22* (2013.01); *F05D 2270/024* (2013.01); *F05D 2270/304* (2013.01); *F05D 2270/313* (2013.01); *F05D 2270/331* (2013.01)

(56) References Cited

U.S. PATENT DOCUMENTS

| | | | | |
|---|---|---|---|---|
| 4,299,088 A * | 11/1981 | Rowen | F02C 9/54 | 60/39.27 |
| 4,428,194 A * | 1/1984 | Stokes | F02C 9/18 | 415/27 |
| 4,539,810 A * | 9/1985 | Watanabe | F02C 3/10 | 60/39.25 |
| 4,809,497 A * | 3/1989 | Schuh | F02C 3/085 | 417/280 |
| 4,864,816 A * | 9/1989 | Benvenuti | F01D 17/06 | 60/792 |
| 6,226,974 B1 * | 5/2001 | Andrew | F02C 9/28 | 60/772 |
| 6,364,602 B1 * | 4/2002 | Andrew | F01D 21/10 | 415/1 |
| 6,735,955 B2 * | 5/2004 | Mannarino | F04D 27/0246 | 60/794 |
| 9,951,696 B2 * | 4/2018 | Nanataki | F02C 9/00 | |
| 2004/0011051 A1 * | 1/2004 | Ryan | F02C 9/28 | 60/773 |
| 2004/0055273 A1 * | 3/2004 | Hirayama | F02C 9/28 | 60/39.281 |
| 2005/0109033 A1 * | 5/2005 | Braun | F02C 7/141 | 60/772 |
| 2005/0131616 A1 * | 6/2005 | Fujii | F01D 15/10 | 701/100 |
| 2007/0031238 A1 * | 2/2007 | Fujii | F02C 9/20 | 415/48 |
| 2009/0071165 A1 * | 3/2009 | Matz | F01D 5/10 | 60/772 |
| 2010/0005808 A1 * | 1/2010 | Nanataki | F02C 9/20 | 60/773 |
| 2010/0180604 A1 * | 7/2010 | Kawai | F23N 5/184 | 60/778 |
| 2011/0037276 A1 * | 2/2011 | Hoffmann | F02C 9/22 | 290/40 C |
| 2012/0017600 A1 * | 1/2012 | Saito | F02C 9/263 | 60/773 |
| 2012/0167581 A1 * | 7/2012 | Pesce | F01K 23/101 | 60/773 |
| 2012/0259528 A1 * | 10/2012 | Minto | F01D 17/16 | 701/100 |
| 2013/0118146 A1 * | 5/2013 | Nanataki | F02C 9/00 | 60/39.182 |
| 2014/0000272 A1 * | 1/2014 | Fichtner | F02C 9/20 | 60/773 |
| 2014/0033720 A1 * | 2/2014 | Kim | F02C 3/30 | 60/726 |
| 2014/0053567 A1 * | 2/2014 | Langenbacher | F01D 15/10 | 60/773 |
| 2014/0090353 A1 * | 4/2014 | Simons | F02C 9/16 | 60/39.5 |
| 2014/0156165 A1 * | 6/2014 | Ewens | F02C 9/28 | 701/100 |
| 2014/0325990 A1 * | 11/2014 | Takeda | F02C 9/20 | 60/775 |
| 2014/0352320 A1 * | 12/2014 | Nanataki | F02C 3/10 | 60/774 |
| 2015/0135722 A1 * | 5/2015 | Takahashi | F02C 3/107 | 60/774 |
| 2015/0171705 A1 * | 6/2015 | Hino | F01D 15/10 | 290/1 A |
| 2016/0245172 A1 * | 8/2016 | Myoren | F02C 9/22 | |
| 2017/0096936 A1 * | 4/2017 | Nilsson | F02C 3/10 | |
| 2017/0145924 A1 * | 5/2017 | Zhang | G01M 15/14 | |
| 2017/0159562 A1 * | 6/2017 | Takahashi | F02C 3/10 | |
| 2017/0254282 A1 * | 9/2017 | Sonoda | F02C 9/20 | |

FOREIGN PATENT DOCUMENTS

| | | |
|---|---|---|
| CN | 105317561 A | 2/2016 |
| EP | 0363301 A1 | 9/1989 |
| EP | 2143908 A2 | 10/2009 |
| JP | 2001-200730 A | 7/2001 |
| JP | 2011-038531 A | 2/2011 |

OTHER PUBLICATIONS

Extended European Search Report for European Patent Application No. 17153022.3 dated Aug. 8, 2017.

* cited by examiner

2-SHAFT GAS TURBINE, AND THE CONTROL METHOD OF OPENING DEGREE OF INLET GUIDE VANE OF THE GAS TURBINE

CLAIM OF PRIORITY

The present application claims priority from Japanese Patent application serial No. 2016-64976, filed on Mar. 29, 2016, the content of which is hereby incorporated by reference into this application.

BACKGROUND OF THE INVENTION

Field of the Invention

The present invention relates to a 2-shaft gas turbine and a control method of an inlet guide vane of the gas turbine, in particular, to a 2-shaft gas turbine that is suitable for including a gas generator configured of a compressor, a combustor, and the high pressure turbine for driving the compressor, and a low pressure turbine for driving a load, and a control method of a inlet guide vane of the gas turbine.

Background Art

In recent years, a demand for a gas turbine for driving a machine suitable for production of Liquid Natural Gas (LNG) has been increased with an increase in energy demand. In a LNG plant, liquefaction is achieved by causing natural gas to be high pressure in a LNG liquefaction compressor. Particularly, a 2-shaft gas turbine is often used for driving the LNG liquefaction compressor.

In the 2-shaft gas turbine, a turbine portion is divided into a low pressure turbine and a high pressure turbine, and the low pressure turbine drives a load such as the LNG compressor or a power generator and the high pressure turbine is connected to the compressor as the gas generator. The 2-shaft gas turbine has a feature that the high pressure turbine and the low pressure turbine respectively have different rotation shafts.

As described above, the 2-shaft gas turbine is not only used for driving a machine but also used for power generation by being connected to the power generator. As the gas turbine for power generation, since a structure is simple, it is easy to operate, and the like, a 1-shaft gas turbine in which a compressor and a turbine are rotated at the same shaft is a mainstream. However, in a case where an apparatus is small in size, it is necessary to keep a rotational speed according to a specification of the power generator and there is a drawback that a speed reducer is required.

On the other hand, if the 2-shaft gas turbine is used for power generation, since a rotational speed of a gas generator configured of a compressor, a combustor, and a high pressure gas turbine and a rotational speed of the low pressure turbine can be arbitrary selected, the speed reducer is not required. Therefore, it is possible to provide a compact and highly efficient gas turbine.

In a case where such a 2-shaft gas turbine is operated, an inlet guide vane (hereinafter, referred to as IGV) of the compressor is adjusted based on a corrected speed obtained by correcting an influence of an ambient temperature on an actual speed of a gas generator shaft (high pressure gas turbine shaft), that is, in general, the IGV is controlled on the basis of the corrected speed irrespective of an operational status of the gas generator.

In this case, as illustrated in a relationship between the corrected speed of the gas generator and an IGV set angle in FIG. 9A, the IGV set angle is changed (relationship between the corrected speed of the gas generator shaft and the IGV set angle is uniquely determined) according to the corrected speed that is correlated with the ambient temperature. Therefore, as illustrated in a relationship between the actual speed of the gas generator shaft and the IGV set angle in FIG. 9B, since an operation line is changed, the rotational speed of the gas generator shaft is changed by the ambient temperature. That is, even when operating the IGV in the vicinity of a rated load by increasing the IGV set angle, the actual speed is changed by the ambient temperature.

Therefore, since a region to avoid resonance of a blade is increased during the rated load operation, it is difficult to have resonance avoidance design. In addition, if the resonance avoidance range is increased, since a degree of freedom of an airfoil design is decreased, it is also difficult to improve an aerodynamic characteristics of the blade.

In order to avoid the problem of the resonance during the rated load operation, a control method of a 2-shaft gas turbine is disclosed in JP-A-2011-38531. In JP-A-2011-38531, attention is given to that importance of avoidance of surge (fluid pulsation phenomenon occurring due to separation of a flow of a compressor blade) by corrected speed reference control is reduced during a high speed rotation including rated load operation conditions. In the 2-shaft gas turbine configured of the gas generator and the low pressure turbine, as a control unit of the IGV, the IGV set angle is controlled with the corrected speed reference during the low speed rotation of the gas generator shaft and the IGV set angle is controlled so as to maintain the actual speed constant during the high speed rotation.

As illustrated in a relationship between the corrected speed of the gas generator shaft and the IGV set angle in FIG. 10A and as illustrated in a relationship between the actual speed of the gas generator shaft and the opening degree of the IGV in FIG. 10B, the operation lines are the same irrespective of the ambient temperature during applying a low load by using the control method of the 2-shaft gas turbine described in JP-A-2011-38531, but the corrected speed is changed by the ambient temperature during applying a high load. On the other hand, the operation line is changed by the ambient temperature during applying the low load, but the rotational speed of the gas generator shaft is constant during applying the high load.

Therefore, it is possible to effectively eliminate the resonance problem (problem that a rotor of the turbine or the compressor is likely to be damaged by the resonance that occurs when the rotational speed approaches a resonance rotational speed during the high speed rotation of the gas generator shaft) and it is possible to effectively correspond to compressor surging during the low speed rotation. Therefore, it is possible to reduce a load on a design for the resonance problem and the resonance avoidance design described above is facilitated.

As described above, in JP-A-2011-38531, a main object thereof is to primarily improve reliability such as surge avoidance or resonance avoidance and performance during operation is not much mentioned.

In general, in the gas turbine, the corrected speed and a pressure ratio are increased and an output and efficiency are increased as a temperature is lowered, but, on the other hand, in the compressor, a shock wave loss is increased and efficiency is decreased by the increase in the corrected speed more than a case of a rated condition (usually 15° C.). Typically, the influence is less than performance improvement effect of the entire gas turbine described above. However, in a case where a compressor (specifically, a compressor of which an inlet Mach number at outer casing inflow of a first stage is equal to or greater than 1.2, and the like) having a large Mach number at rated conditions for the purpose of large flow rate is used, it becomes impossible to ignore the influence of the compressor efficiency decrease.

Furthermore, in a case where the ambient temperature is low, in addition to the reliability described in JP-A-2011-38531, it is also necessary to suppress reliability degradation due to an axial distribution of blade loadings change. That is, as illustrated in a relationship between an ambient temperature and an axial distribution of blade loadings in FIG. 11A, a blade load of the forward stage by rated conditions is reduced and a blade load of the rear stage is increased by an increase in the corrected speed at low temperature. Therefore, a high vibration stress occurs due to the separation of the flow in a blade of the rear stage and the blade of the rear stage may be damaged.

In addition, a technique for improving the gas turbine performance at low temperature by an operation is disclosed in JP-A-2001-200730. In JP-A-2001-200730, attention is given to that an increase in a gas turbine output is often suppressed for power generation at low temperature and it is characterized by reducing an IGV set angle for operation under low temperature conditions.

According to JP-A-2001-200730, it is possible to maintain a combustion temperature that is decreased at low temperature in the vicinity of a rated combustion temperature and it leads to an improvement in gas turbine efficiency by throttling a mass flow by decreasing the IGV set angle.

However, in a case of using the control method described in JP-A-2011-38531, as described above, performance degradation of the compressor and reliability of the blade of the rear stage at low temperature may be problems. On the other hand, in a case of using the control method described in JP-A-2001-200730, although the efficiency is likely to be improved, the IGV set angle is reduced than the rated condition.

In general, as in FIG. 11B illustrating a relationship between the IGV set angle and an axial distribution of blade loadings, if the IGV set angle is reduced, since a load of the forward stage is reduced and a load of the rear stage is increased, a risk of damage of the blade of the rear stage may be further increased.

SUMMARY OF THE INVENTION

The invention is made in view of the situation described above and an object thereof is to provide a 2-shaft gas turbine in which performance degradation of a compressor at low temperature is suppressed and reliability of a blade of a rear stage is improved even in a 2-shaft gas turbine configured of a gas generator and a low pressure turbine and a control method of an opening degree of an inlet guide vane of a gas turbine.

In order to achieve the object, a 2-shaft gas turbine of the invention includes a gas generator that is configured of a compressor that has inlet guide vanes on an air intake side and compresses inflow air, a combustor that generates combustion gas by burning air that is compressed by the compressor and fuel, and a high pressure turbine driven by the combustion gas generated by the combustor; and a low pressure turbine that is driven by gas discharged from the high pressure turbine. A high pressure turbine shaft that connects the compressor to the high pressure turbine, and a low pressure turbine shaft that connects the low pressure turbine to a load are separated shafts, and an inlet mass flow rate to the compressor is adjusted by controlling an opening degree of the inlet guide vane. As a unit that controls the opening degree of the inlet guide vane, a first control unit that adjusts the opening degree of the inlet guide vane so as to keep an actual speed of the high pressure turbine shaft constant during a high speed rotation of the high pressure turbine shaft; a control status confirmation unit that confirms the actual speed that is kept constant by the first control unit and the opening degree of the inlet guide vane; and a low ambient temperature correction unit that reduces the actual speed that is kept constant by the first control unit in a case where the actual speed that is kept constant by the first control unit input into the control status confirmation unit is equal to or greater than a predetermined threshold value N0, the opening degree of the inlet guide vane is equal to or greater than a predetermined threshold value ξ0, and an ambient temperature is equal to or less than a predetermined threshold value Ta0 are at least included.

In addition, in order to achieve the object, a control method of an inlet guide vane of a 2-shaft gas turbine of the present invention includes a gas generator that is configured of a compressor that has inlet guide vanes on an air intake side and compresses inflow air, a combustor that generates combustion gas by burning air that is compressed by the compressor and fuel, and a high pressure turbine driven by the combustion gas generated by the combustor; and a low pressure turbine that is driven by gas discharged from the high pressure turbine, in which a high pressure turbine shaft that connects the compressor to the high pressure turbine, and a low pressure turbine shaft that connects the low pressure turbine to a load are separated shafts, and an inlet mass flow rate to the compressor is adjusted by controlling an opening degree of the inlet guide vane, in which, in the control of the opening degree of the inlet guide vane, as a unit that controls the opening degree of the inlet guide vane, a first control unit; a control status confirmation unit, and a low ambient temperature correction unit are included, and in the first control unit, the opening degree of the inlet guide vane is adjusted so as to keep an actual speed of the high pressure turbine shaft constant during a high speed rotation of the high pressure turbine shaft; in the control status confirmation unit, the actual speed that is kept constant by the first control unit and the opening degree of the inlet guide vane are conformed; and in the low ambient temperature correction unit, the opening degree of the inlet guide vane is controlled so as to reduce the actual speed that is kept constant by the first control unit in a case where the actual speed that is kept constant by the first control unit input into the control status confirmation unit is equal to or greater than a predetermined threshold value N0, the opening degree of the inlet guide vane is equal to or greater than a predetermined threshold value ξ0, and an ambient temperature is equal to or less than a predetermined threshold value Ta0.

According to the invention, performance degradation of a compressor at low temperature is suppressed and reliability of the blade of the rear stage is improved even in a 2-shaft gas turbine configured of the gas generator and the low pressure turbine.

DETAILED DESCRIPTION OF THE INVENTION

Figure 1:
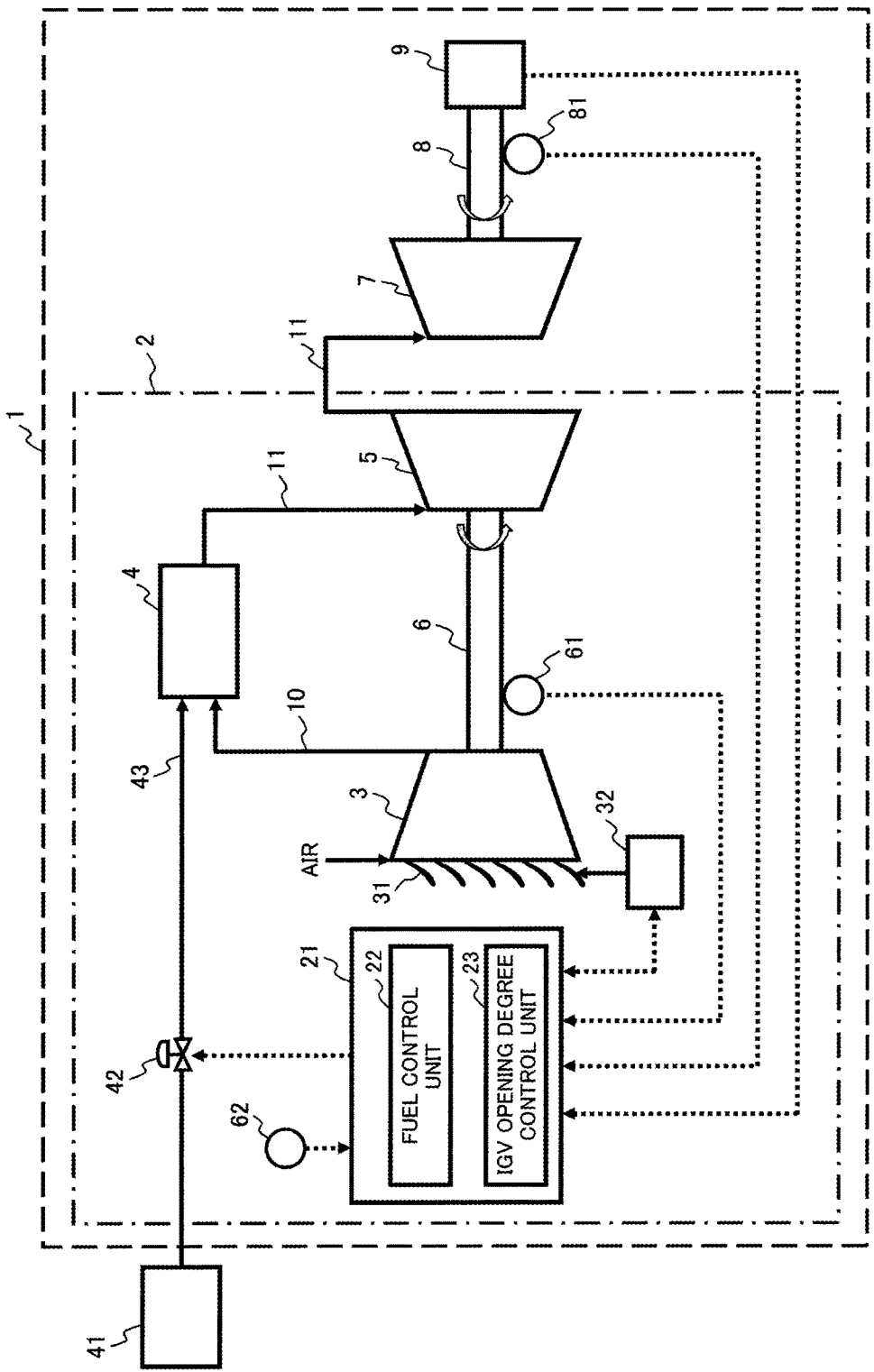
FIG. 1 is a schematic configuration view illustrating Embodiment 1 of a 2-shaft gas turbine of the invention.

Hereinafter, a 2-shaft gas turbine and a control method of an inlet guide vane of the gas turbine of the invention will be described with reference to embodiments illustrated in the drawings. Moreover, in each embodiment, the same reference numerals are given to the same configuration components.

Embodiment 1

FIG. 1 illustrates a schematic configuration of Embodiment 1 of a 2-shaft gas turbine of the invention.

As illustrated in FIG. 1, a 2-shaft gas turbine 1 of the embodiment includes a gas generator 2 configured of a compressor 3 that has an IGV 31 (inlet guide vane) on an air intake side and compresses intake air, a combustor 4 that generates combustion gas by burning compressed air 10 that is compressed by the compressor 3 and fuel 43, and a high pressure turbine 5 that is driven by combustion gas 11 generated by the combustor 4, and a low pressure turbine 7 that is driven by the combustion gas 11 discharged from the high pressure turbine 5. A high pressure turbine shaft (gas generator shaft) 6 that connects the compressor 3 to the high pressure turbine 5, and a low pressure turbine shaft 8 that connects the low pressure turbine 7 to load 9 are configured of separated shafts.

Namely, as illustrated in FIG. 1, the 2-shaft gas turbine 1 is configured of the gas generator 2 consisting of the compressor 3, the combustor 4, and the high pressure turbine 5, and the low pressure turbine 7. The compressor 3 and the high pressure turbine 5 are connected by the high pressure turbine shaft 6 on a gas generator 2 side and the low pressure turbine 7 and the load 9 are connected by the low pressure turbine shaft 8 on a low pressure turbine 7 side.

Moreover, in the embodiment, as the load 9, a power generator is assumed but may be a LNG compressor for driving machine and the like.

As described above, the IGV 31 is provided on the air intake side of the compressor 3 and an IGV set angle 31 is capable of being changed by an IGV control device 32, thereby adjusting an intake air amount (flow-in air amount) of the gas generator 2. In addition, the fuel 43 is supplied from a fuel supply source 41 to the combustor 4 and a supply fuel mass flow rate 43 is controlled by a fuel control valve 42.

As a behavior of a working fluid (air, combustion gas, or the like) in the 2-shaft gas turbine 1, first, the compressed air 10 that flows in the compressor 3 to be compressed flows in the combustor 4. In the combustor 4, the combustion gas of a high temperature is generated by injecting the fuel 43. The combustion gas 11 of a high temperature and a high pressure flows in the high pressure turbine 5 connected to the compressor 3 by the high pressure turbine shaft 6, drives the compressor 3, and then flows in the low pressure turbine 7. When the combustion gas 11 passes through the low pressure turbine 7, the load 9 that is connected by the low pressure turbine shaft 8 is driven and thereby power generation or machine drive is performed.

An operational status of the 2-shaft gas turbine 1 is mainly controlled by a gas generator control device 21 that is disposed on the gas generator 2 side. The gas generator control device 21 is configured of a fuel control unit 22 and an IGV opening degree control unit 23.

The fuel control unit 22 controls the fuel control valve 42 and the supply fuel mass flow rate 43 to the combustor 4 using a rotational speed obtained by a rotational speed detector 81 that is disposed in the low pressure turbine shaft 8 and operation load data obtained from the load 9.

Figure 2:
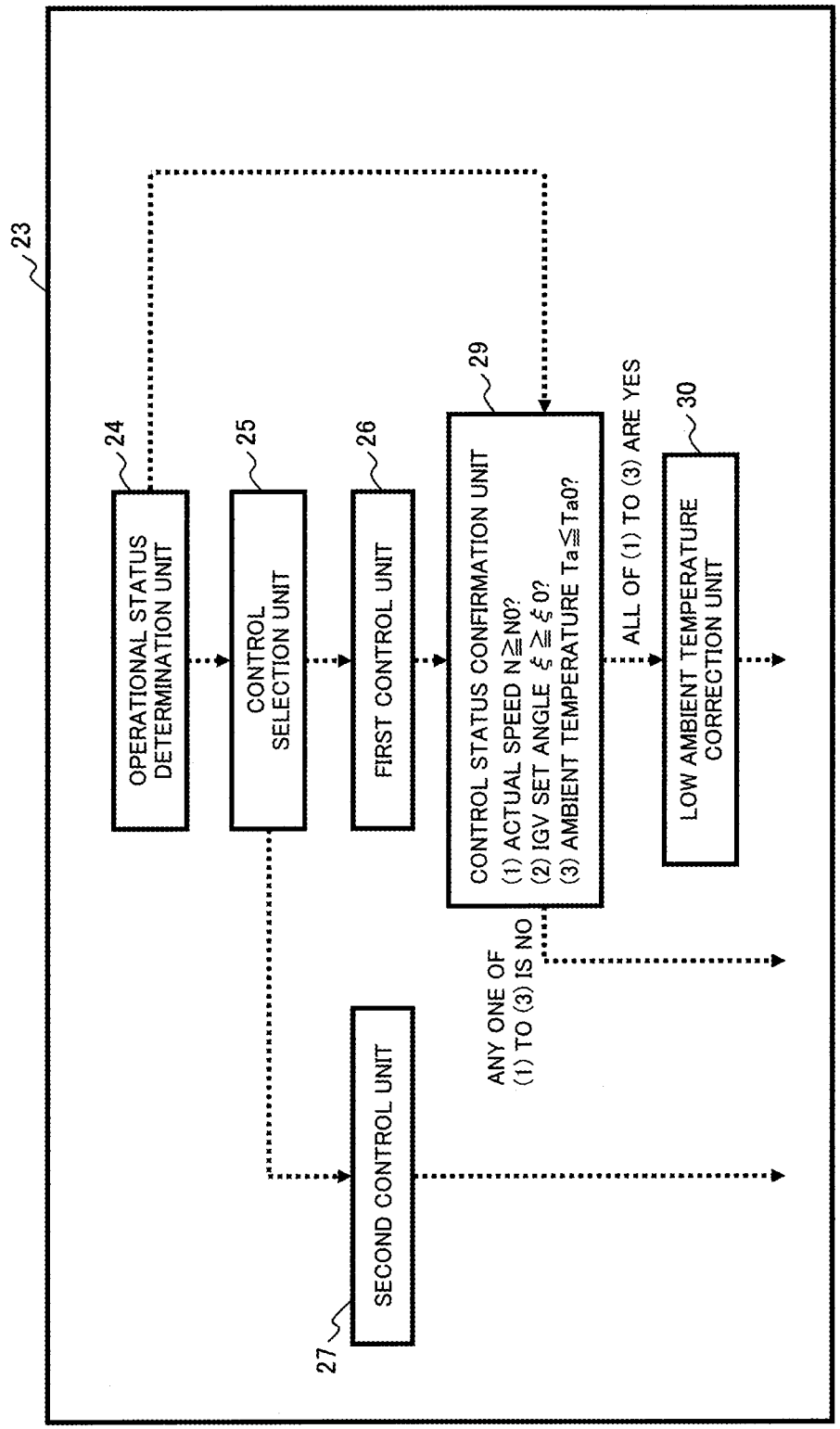
FIG. 2 is a diagram illustrating an IGV opening degree control unit in a gas generator control device that is employed in Embodiment 1 of the 2-shaft gas turbine of the invention.

The IGV opening degree control unit 23 is connected to the IGV control device 32 and the IGV set angle 31, namely, an intake flow amount of the compressor 3 is controlled. In the embodiment, as illustrated in FIG. 2, the IGV opening degree control unit 23 is configured of an operational status determination unit 24, a control selection unit 25, a first control unit 26, a second control unit 27, a control status confirmation unit 29, and a low ambient temperature correction unit 30.

In the second control unit 27, the IGV set angle 31 is controlled on the basis of a corrected speed. Specifically, a corrected speed Nc is calculated using a rotational speed N of the gas generator 2 obtained by a rotational speed detector 61 disposed in the high pressure turbine shaft 6 and an ambient temperature Ta obtained by a thermometer 62. The IGV set angle 31 is adjusted such that a relationship between the corrected speed and the IGV set angle 31 is uniquely determined irrespective of the ambient temperature.

Here, the corrected speed Nc is given by the following equation (1)

$$Nc = N \times [288.15/273.15 + Ta)]^{1/2} \quad (1)$$

Moreover, it is preferable that the control is performed in the second control unit 27 on the basis of the corrected speed illustrated in the embodiment similar to that of JP-A-2011-38531, but other methods may be used.

The first control unit 26 is different from the second control unit 27 and the IGV set angle 31 is controlled so that an actual speed of the gas generator 2 is kept constant. In the embodiment, as the rotational speed to be kept constant, a rated rotational speed, namely, a rotational speed Ndes during a rated operation defined at the time of design is assumed, but other rotational speeds may be used.

In the IGV opening degree control unit 23, whether any one of the first control unit 26 and the second control unit 27 is used is determined by the operational status determination unit 24 and the control selection unit 25.

In the operational status determination unit 24, the operational status of the gas generator 2 is determined in two status of a second operational status configured of actuation and stop status, and a low load operational status, and a first operational status configured of a high load operational status other than the second operational status. As the determination method, a method, in which an target IGV set angle that is capable of being stably operated even if control is changed is set from characteristics of the compressor 3 and the low load operational status and the high load operational status are distinguished based on the target IGV set angle, is employed.

In addition, in the control selection unit 25, a determination result in the operational status determination unit 24 is input and whether any one of the first control unit 26 and the second control unit 27 is used is selected. Specifically, when the operational status is in the low load operational status that is the second operational status, the second control unit 27 is selected such that control in which the corrected speed and the IGV set angle 31 are uniquely determined is performed. When the operational status is in the high load operational status that is the first operational status, the first control unit 26 is selected such that control in which the actual speed is kept constant is performed.

After the determination of the operational status and the control selection are completed, the control is performed through the control status confirmation unit 29 and the low ambient temperature correction unit 30. First, in the control status confirmation unit 29, it is determined whether or not correction is required in the current operational status based on the determination result of the operational status determination unit 24. Specifically, in a status where the first control unit 26 is selected as the control in the high load operational status, it is determined that the correction is required and the determination result is transmitted to the low ambient temperature correction unit 30 only in a case where the actual speed of the gas generator 2 is equal to or greater than a predetermined threshold value N0, the IGV set angle 31 is equal to or greater than the predetermined threshold value ξ0, and the ambient temperature is equal to or less than a predetermined threshold value Ta0.

Here, as the predetermined threshold value N0 of the actual speed of the gas generator 2, the Ndes described above is assumed and as the predetermined threshold value ξ0 of the IGV set angle 31, an opening degree ξdes during the rated operation defined at the time of design is assumed.

Moreover, in the embodiment, the control status confirmation unit 29 is independently described, but may be included in the low ambient temperature correction unit 30 or the operational status determination unit 24.

In a case where it is determined that the correction is required by the control status confirmation unit 29, in the low ambient temperature correction unit 30, control is performed by sending a signal to the fuel control unit 22 such that the correction coefficient α is multiplied to the rotational speed N of the gas generator 2 and the rotational speed is reduced to the N'.

Figure 3:
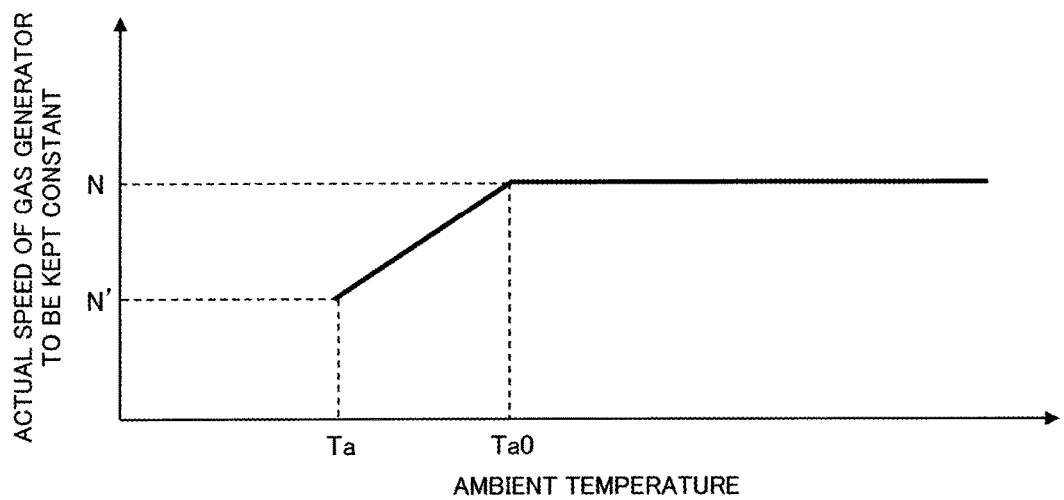
FIG. 3 is a diagram illustrating a relationship between an ambient temperature and an actual speed when correction is performed by a rotational speed correction coefficient α in Embodiment 1 of the 2-shaft gas turbine of the invention.

A relationship between the ambient temperature and the correction coefficient α of the embodiment is indicated by equation (2) and is illustrated in FIG. 3 (β is a constant number). Namely, the actual speed is reduced from N to N' so as to be proportional to a reduction amount from the predetermined threshold value Ta0 of the ambient temperature.

$$\alpha = 1 - \beta(Ta0 - Ta) \quad (2)$$

If the relationship between the actual speed and the IGV set angle in the control described above is summarized, it becomes as in FIGS. 4A and 4B.

Figure 4A:
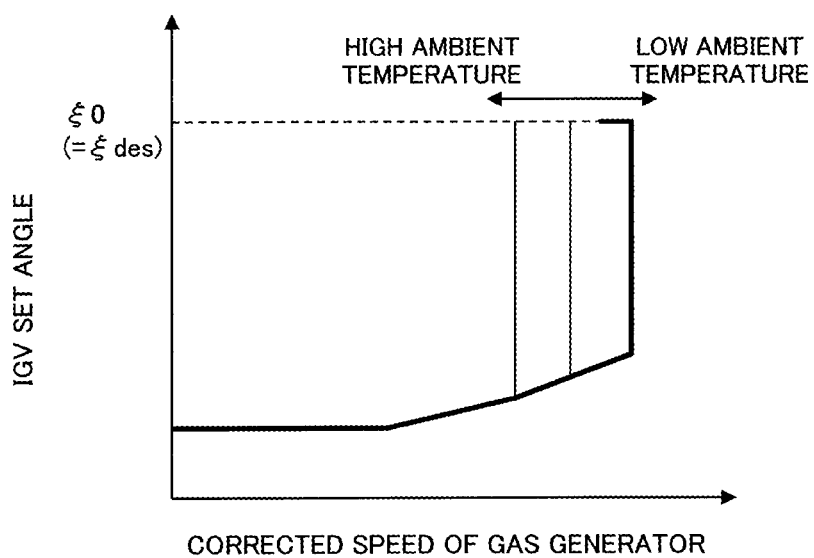
FIG. 4A is a diagram illustrating a relationship between a corrected speed of a high pressure turbine shaft and the IGV opening degree in Embodiment 1 of the 2-shaft gas turbine of the invention.
Figure 4B:
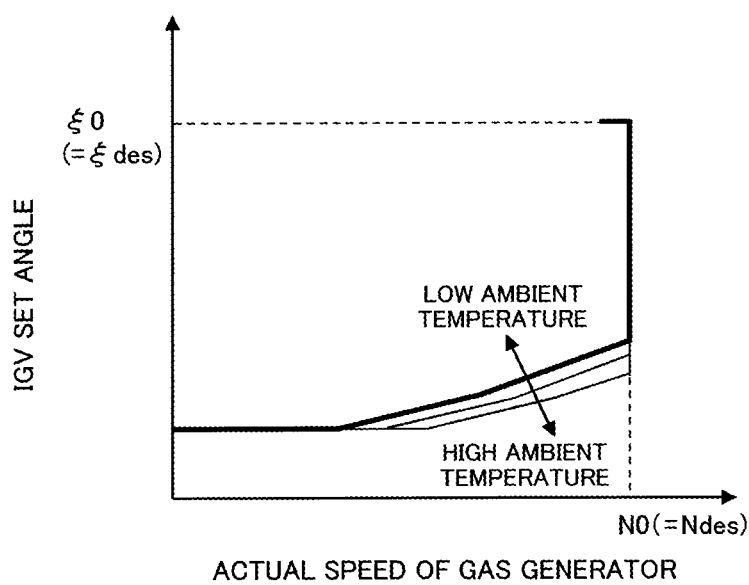
FIG. 4B is a diagram illustrating a relationship between the actual speed of the high pressure turbine shaft and the IGV opening degree in Embodiment 1 of the 2-shaft gas turbine of the invention.

Namely, as illustrated in FIGS. 4A and 4B, the corrected speed during operation is reduced and is closer to the rated rotational speed by reducing the rotational speed in the low ambient temperature and the high load operational status by the low ambient temperature correction unit 30. Namely, it is possible to suppress a decrease in the efficiency of the compressor due to an increase in shock wave loss under low ambient temperature conditions that is concerned in actual speed constant control by the first control unit 26.

In addition, in general, since blade load of the compressor becomes high load in the forward stage and low load in the rear stage due to the reduction of the rotational speed, a risk for damage of the blade of the rear stage that is concerned under the low ambient temperature conditions is also reduced. Namely, the efficiency and reliability of the compressor 3 are improved in the low ambient temperature and the low load operational status compared to the control described in JP-A-2011-38531. At the same time, since operable ambient temperature conditions are expanded, it also contributes to operational improvement of the 2-shaft gas turbine 1.

However, if the reduction amount is excessively large when reducing the rotational speed from the rotational speed N of the gas generator 2 to the actual speed N', an effect of resonance avoidance region (the region where it is necessary to avoid the resonance of blade) reduction in the high load operational status by using the first control unit 26 is eliminated.

Therefore, in the embodiment, the rotational speed correction coefficient α is used to satisfy the following equation (3). The equation (3) means that the corrected speed calculated from the operational status after correcting the rotational speed to the actual speed N' is greater than the actual speed N before the correction, and it is possible to reduce the resonance avoidance region than at least a case where the corrected speed reference control is performed in the high load operational status.

$$N' \times [288.15/(273.15+Ta)]^{1/2} > N \qquad (3)$$

Embodiment 2

As described above, in Embodiment 1, as the predetermined threshold value N0 of the actual speed, the rotational speed Ndes is assumed and as the predetermined threshold value ξ0 of the IGV set angle 31, the rated opening degree ξdes is assumed when it is determined that the correction is required by the control status confirmation unit 29, but other values may be used.

Figure 5A:
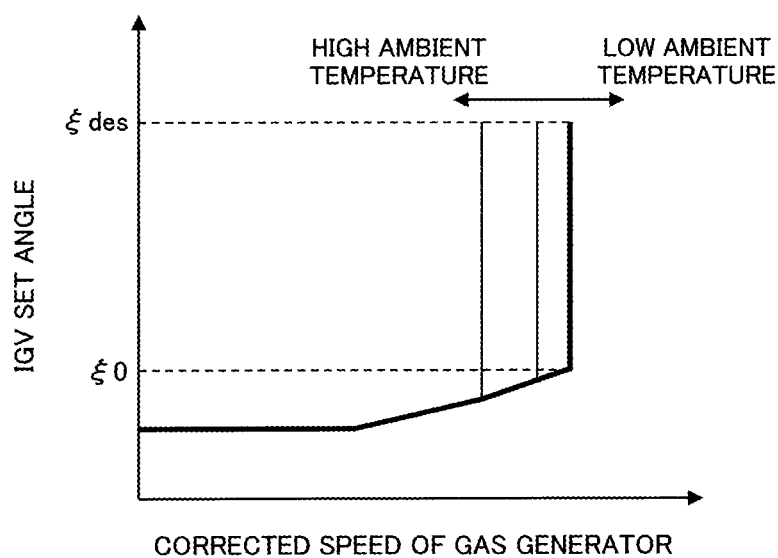
FIG. 5A is a diagram illustrating a relationship between a corrected speed of a gas generator shaft and an IGV opening degree in Embodiment 2 that is a modification example of Embodiment 1 of the 2-shaft gas turbine of the invention.
Figure 5B:
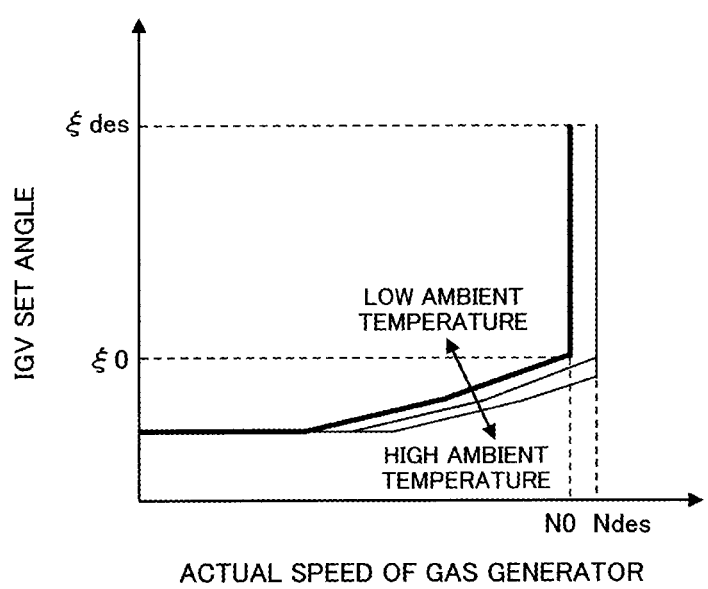
FIG. 5B is a diagram illustrating a relationship between an actual speed of the gas generator shaft and the IGV opening degree in Embodiment 2 that is the modification example of Embodiment 1 of the 2-shaft gas turbine of the invention.

As Embodiment 2 that is a modification example in a case where the other values are used, an example of a rotational speed and an IGV set angle is illustrated in FIGS. 5A and 5B.

In FIGS. 5A and 5B, a predetermined threshold value N0 of an actual speed of a gas generator 2 and the predetermined threshold value ξ0 of the IGV set angle 31 are less than values (Ndes and ξdes) during the rated operation. Therefore, the rotational speed is to be kept constant by the first control unit 26 and the rotational speed for increasing the IGV set angle 31 is decreased to an actual speed NO of the gas generator 2 at low temperature of the ambient temperature Ta.

In a case of the embodiment, the corrected speed to be maximized is reduced with respect to all the opening degrees of the IGV more than a case where the embodiment is not applied (for example, JP-A-2011-38531 and the like). Therefore, an effect of reliability improvement due to efficiency decrease suppression and the rear stage blade load reduction at low temperature described above is obtained even in load conditions in a portion in which the IGV set angle 31 is small.

Embodiment 3

Figure 6:
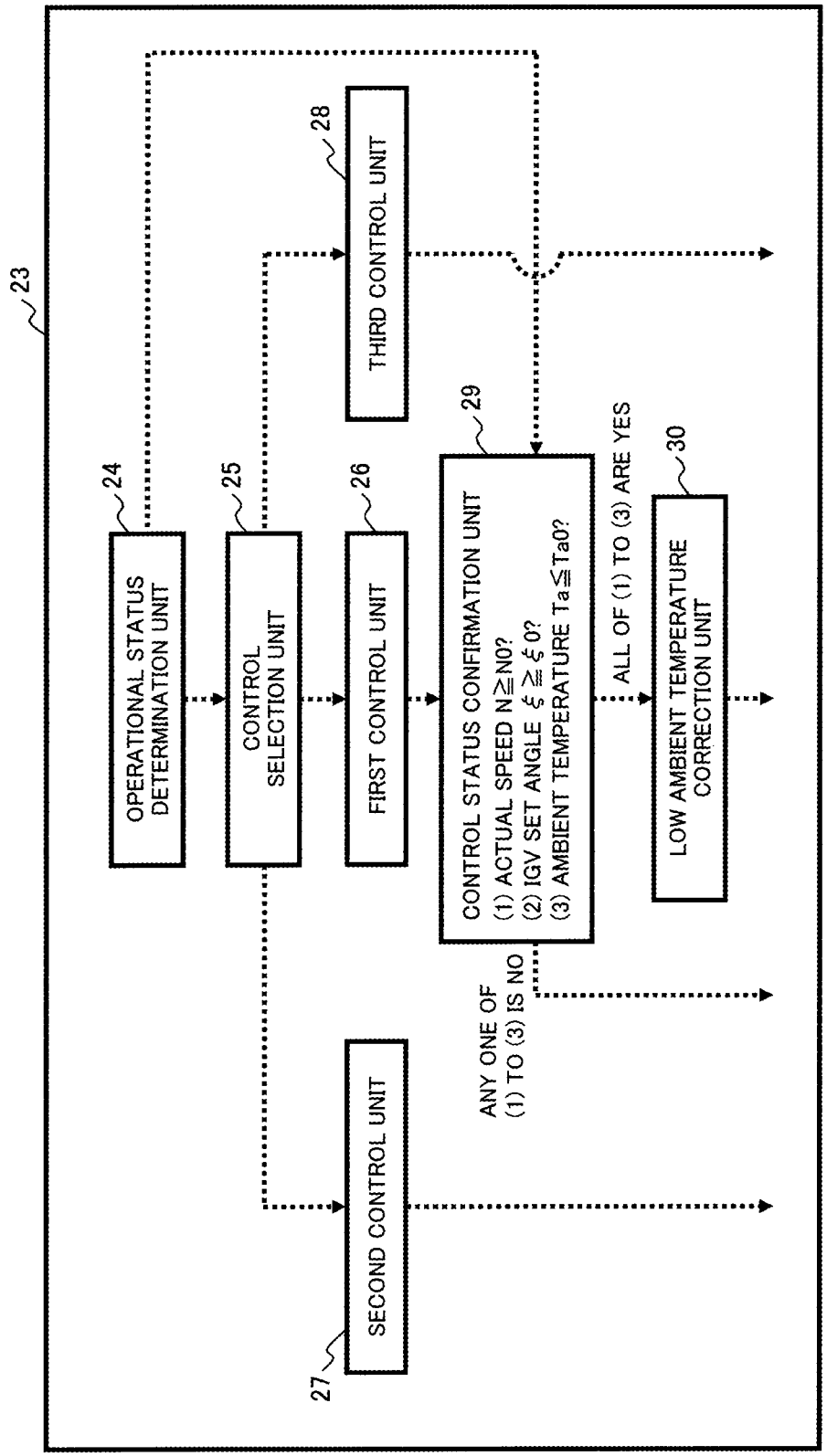
FIG. 6 is a diagram illustrating an IGV opening degree control unit in a gas generator control device employed in Embodiment 3 of the 2-shaft gas turbine of the invention.

As Embodiment 3 that is another modification example of the embodiment, a configuration example of the gas generator control device 21 is illustrated in FIG. 6. A relationship between a corrected speed of a gas generator 2 and an IGV set angle, and a relationship between an actual speed of the gas generator 2 and the IGV set angle are illustrated in FIGS. 7A and 7B.

Although the concept of the embodiment is also described in JP-A-2011-38531, the embodiment is characterized in that a third control unit 28 that causes the IGV set angle 31 to be kept constant irrespective of the rotational speed is provided in the configuration of the IGV opening degree control unit 23 of Embodiment 1.

Specifically, control (C) by the third control unit 28 is used between control (B) by the second control unit 27 and control (A) by the first control unit 26.

Figure 7A:
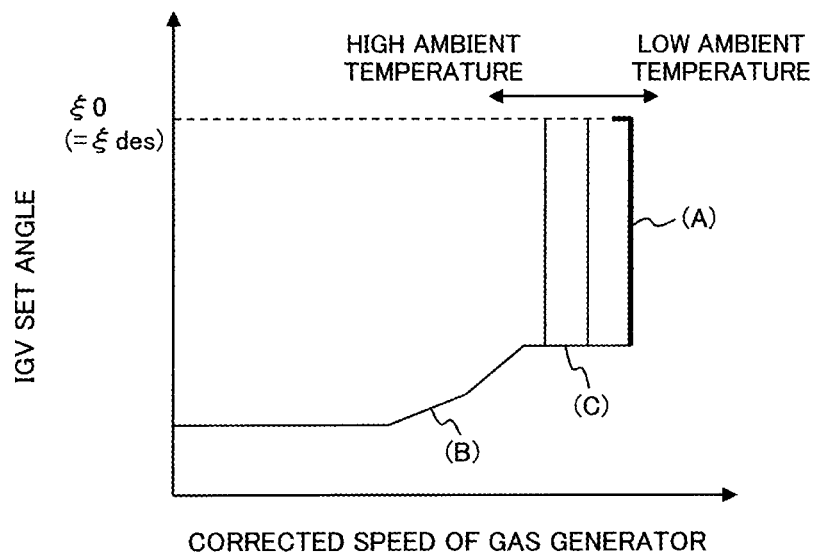
FIG. 7A is a diagram illustrating a relationship between a corrected speed of a high pressure turbine shaft and an IGV opening degree in Embodiment 3 of the 2-shaft gas turbine of the invention.
Figure 7B:
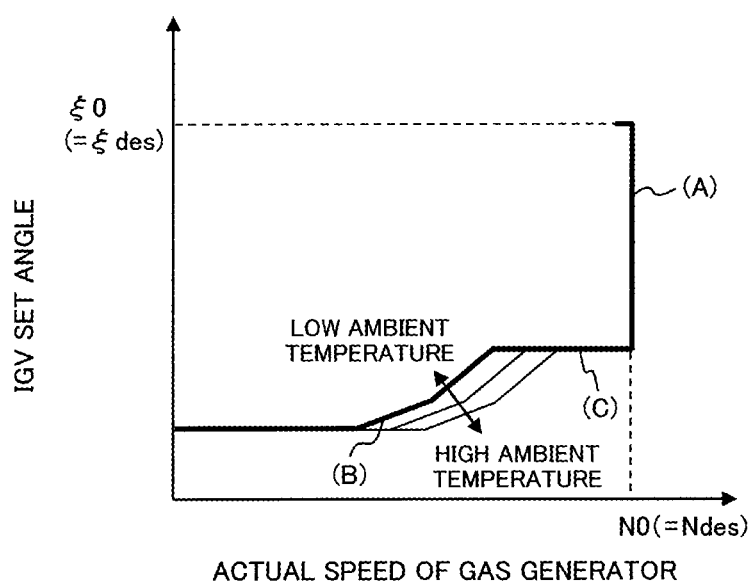
FIG. 7B is a diagram illustrating a relationship between an actual speed of the high pressure turbine shaft and the IGV opening degree in Embodiment 3 of the 2-shaft gas turbine of the invention.

If the control is used, as illustrated in FIGS. 7A and 7B, it is possible to transit to rated load conditions without passing through conditions in which the rotational speed is great and the IGV set angle 31 is small. Under the conditions in which the rotational speed is great and the opening degree of the IGV 31 is small, only the IGV set angle 31 is greatly reduced from the rated load conditions and deviation of a flow field from the rated load conditions is increased. Therefore, performance degradation is likely to occur, but it is possible to suppress the performance degradation by applying the control by the third control unit 28.

In summary, it is possible to suppress performance degradation of the compressor in the low ambient temperature and the high load operational status, and reliability degradation due to the increase in the rear stage blade load, which are concerned in JP-A-2011-38531 and JP-A-2001-200730 while ensuring the effect of the resonance avoidance region reduction of the high load operational status (at high rotational speed) described in JP-A-2011-38531, by using Embodiment 1.

Furthermore, it is possible to expect the same effect even in part load (operation) other than the rated operation condition by using Embodiments 2 and 3. Therefore, it is possible to improve the reliability of the compressor 3 and operability of the 2-shaft gas turbine 1.

Embodiment 4

Figure 8:
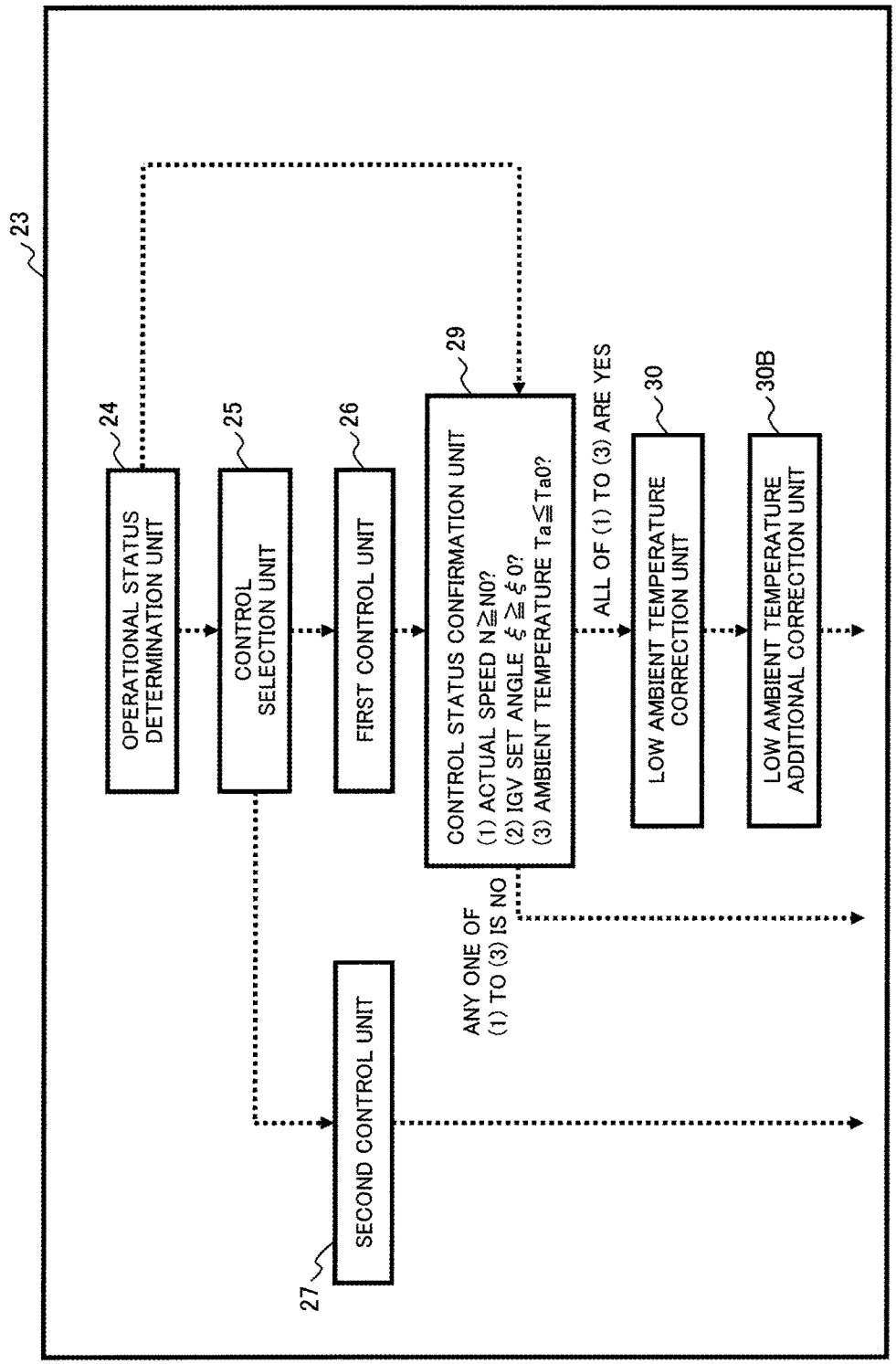
FIG. 8 is a diagram illustrating an IGV opening degree control unit in a gas generator control device that is employed in Embodiment 4 of the 2-shaft gas turbine of the invention.
Figure 9A:
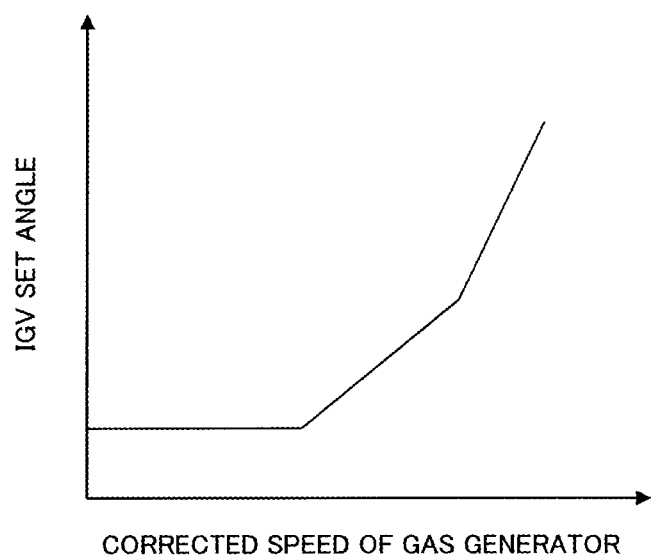
FIG. 9A is a diagram illustrating a relationship between a corrected speed of a high pressure turbine shaft and an IGV opening degree in a conventional 2-shaft gas turbine.
Figure 9B:
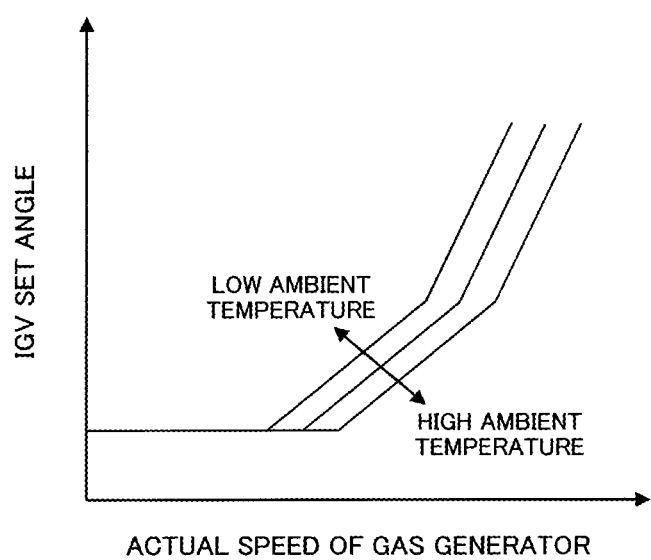
FIG. 9B is a diagram illustrating a relationship between an actual speed of a high pressure turbine shaft and the IGV opening degree in the conventional 2-shaft gas turbine.
Figure 10A:
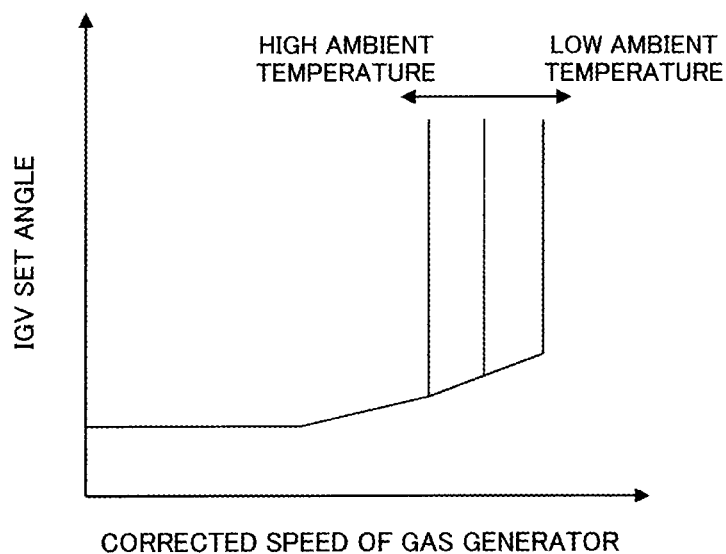
FIG. 10A is a diagram illustrating a relationship between a corrected speed of a high pressure turbine shaft and an IGV opening degree in JP-A-2011-38531.
Figure 10B:
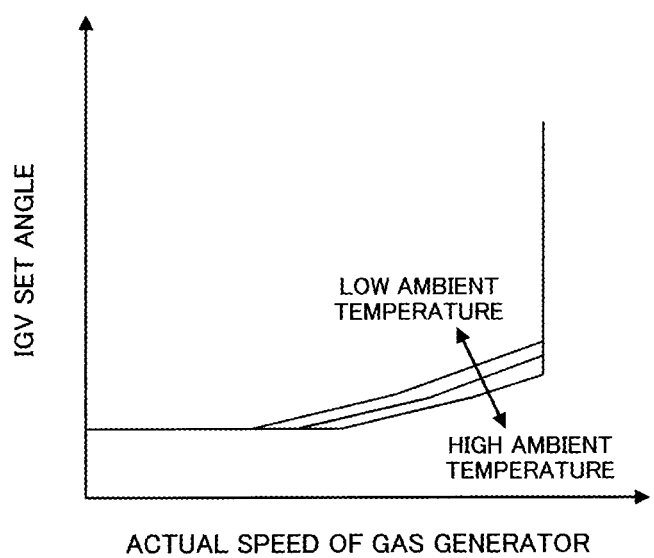
FIG. 10B is a diagram illustrating a relationship between an actual speed of the high pressure turbine shaft and the IGV opening degree in JP-A-2011-38531.

An IGV opening degree control unit 23 in a gas generator control device 21 that is employed in Embodiment 4 of the 2-shaft gas turbine 1 of the invention is illustrated in FIG. 8.

A difference of the embodiment illustrated in FIG. 8 from Embodiment 1 illustrated in FIG. 2 is that a low ambient temperature additional correction unit 30B that increases an IGV set angle 31 is included in the IGV opening degree control unit 23 in addition to a low ambient temperature correction unit 30. Moreover, the same reference numerals are given to devices overlapped with those of Embodiment 1 illustrated in FIG. 2 and detailed description will be omitted.

An operation at a low temperature in the embodiment will be described with reference to FIG. 8.

Similar to Embodiment 1, even in the embodiment, it is determined whether or not correction is required in a current operational status based on a determination result of a operational status determination unit 24 in a control status confirmation unit 29, and then the correction is executed by the low ambient temperature correction unit 30 and the low ambient temperature additional correction unit 30B.

Specifically, in a status where a first control unit 26 is selected as the control in the high load operational status, the determination result in which the correction is required is transmitted to the low ambient temperature correction unit 30 and the low ambient temperature additional correction unit 30B only in a case where the actual speed of the gas generator 2 is equal to or greater than a predetermined threshold value N0, the IGV set angle 31 is equal to or greater than the predetermined threshold value ξ0, and the ambient temperature is equal to or less than a predetermined threshold value Ta0.

If it is determined that the correction is required by the control status confirmation unit 29, similar to Embodiment 1, control for decreasing the actual speed of the gas generator 2 is performed in the low ambient temperature correction unit 30. On the other hand, in the low ambient temperature additional correction unit 30B, in a case where the ambient temperature is equal to or less than the predetermined threshold value Ta0, control in which a signal is sent to the IGV control device 32 is executed to increase the IGV set angle 31 of the gas generator 2. Namely, in the embodiment, not only the rotational speed is reduced but also the IGV set angle 31 is increased in the low ambient temperature conditions.

Figure 11A:
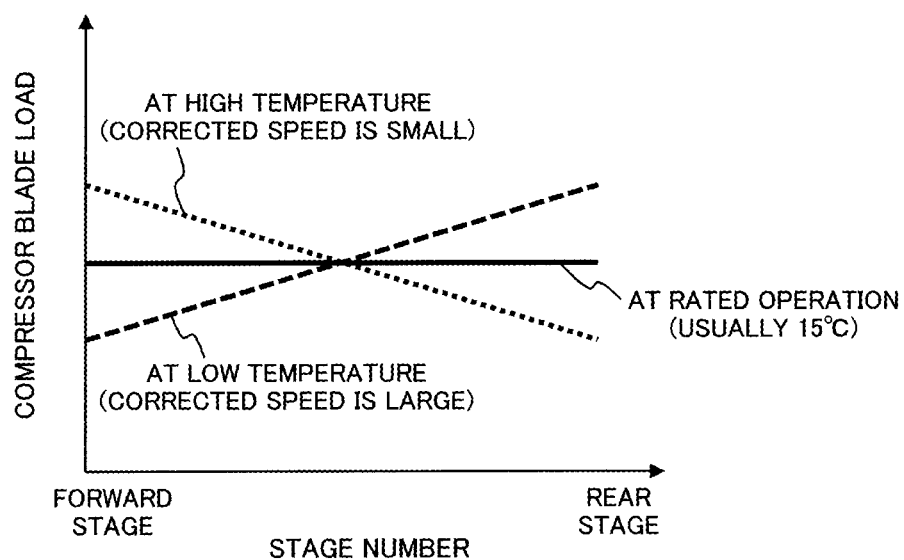
FIG. 11A is a diagram illustrating a relationship between an ambient temperature and distribution of blade loadings in a general compressor.
Figure 11B:
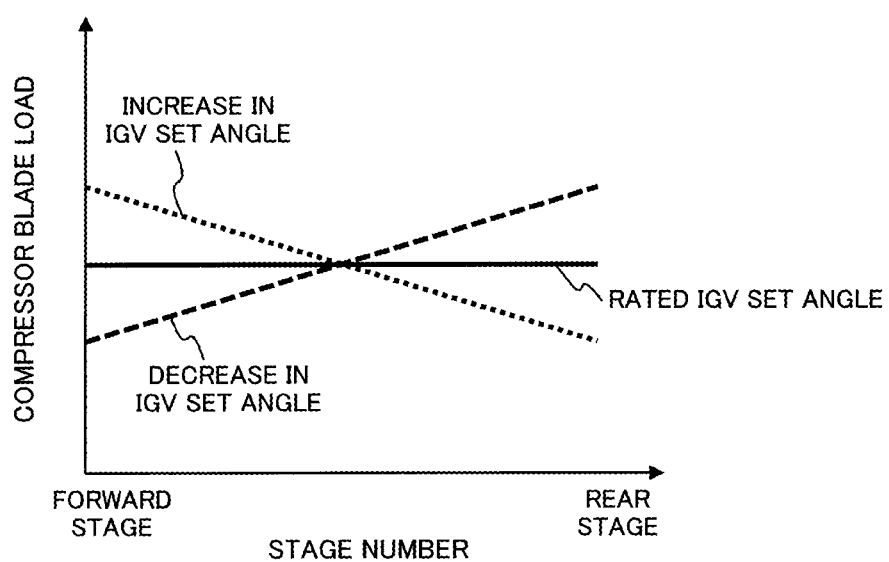
FIG. 11B is a diagram illustrating a relationship between an IGV opening degree and the axial distribution of blade loadings in a general compressor.

In a case where the IGV set angle 31 is increased, since inflow and outflow angles, namely, speed triangles in the blade in the vicinity of the IGV 31 are deviated from design values (usually, adjusted to the rated load conditions), as illustrated in FIG. 11B, the load on a forward stage side is relatively increased and the load on a rear stage side is decreased. That is, if the control as in the embodiment is performed, reduction of the load of the blade of the rear stage is also obtained by not only the decrease (closer to the rated rotational speed) in the corrected speed illustrated in Embodiment 1 but also increase in the IGV set angle 31. Therefore, it is possible to improve the reliability of the blade of the rear stage more than that of Embodiment 1.

In addition, the intake flow amount of the compressor 3 is increased by increasing the IGV set angle 31 compared to that of Embodiment 1. If the intake flow amount of the compressor 3 is increased, entire matching is shifted on a high pressure side and thereby a combustion temperature is increased. Therefore, it is considered that the effect of the improvement of entire performance of the gas turbine is increased in the embodiment more than that of Embodiment 1.

In summary, similar to Embodiment 1, it is possible to suppress performance degradation of the compressor in the low ambient temperature and the high load operational status and reliability degradation due to the increase in the rear stage blade load by using the embodiment. In addition, since the rear stage blade load is decrease by the increase in the IGV set angle 31 more than that of Embodiment 1, suppression effect of reliability degradation is increased. Furthermore, the intake flow amount of the compressor 3 is increased and the entire performance is also increased more than those of Embodiment 1.

In addition, it is also possible to apply the control indicated in Embodiments 1 to 3 to the 2-shaft gas turbine 1 of the embodiment. In this case, similar to Embodiment 1, even during part load (operation) other than the rated load operating condition, it is also possible to expect the effect of efficiency reduction suppression and the effect of reliability improvement described above. Namely, it is possible to improve the reliability of the compressor 3 and operability of the 2-shaft gas turbine 1.

Moreover, the invention is not limited to the embodiments described above and includes various modifications. For example, the embodiments described above are those described in detail for the purpose of better understanding of the invention and are not limited to those having necessarily all described configurations. In addition, it is possible to replace a part of configurations of an embodiment to configurations of another embodiment and may add the configuration of an embodiment to the configuration of another embodiment. Addition, deletion, and replacement of other configurations may be performed to a part of the configurations of each embodiment.

REFERENCE SIGNS LIST

1: 2-shaft gas turbine
2: gas generator
3: compressor
4: combustor
5: high pressure turbine
6: high pressure turbine shaft (gas generator shaft)
7: low pressure turbine
8: low pressure turbine shaft
9: load
10: compressed air
11: combustion gas
21: gas generator control device
22: fuel control unit
23: IGV opening degree control unit
24: operational status determination unit
25: control selection unit
26: first control unit
27: second control unit
28: third control unit
29: control status confirmation unit
30: low ambient temperature correction unit
30B: low ambient temperature additional correction unit
31: IGV (inlet guide vane)
32: IGV control device
41: fuel supply source
42: fuel control valve
43: fuel
61,81: rotational speed detector
62: thermometer

What is claimed is:

1. A 2-shaft gas turbine comprising:
a gas generator that is configured of a compressor that has inlet guide vanes on an air intake side and compresses inflow air, a combustor that generates combustion gas by burning air that is compressed by the compressor and fuel, and a high pressure turbine driven by the combustion gas generated by the combustor; and
a low pressure turbine that is driven by gas discharged from the high pressure turbine,
wherein a high pressure turbine shaft that connects the compressor to the high pressure turbine, and a low pressure turbine shaft that connects the low pressure turbine to a load are separated shafts, and an inflow air amount to the compressor is adjusted by controlling an opening degree of the inlet guide vane, and
wherein as a unit that controls the opening degree of the inlet guide vane, a first control unit that adjusts the opening degree of the inlet guide vane so as to keep an actual speed of the high pressure turbine shaft constant during a high speed rotation of the high pressure turbine shaft; a control status confirmation unit that confirms the actual speed that is kept constant by the first control unit and the opening degree of the inlet guide vane; and a low atmospheric temperature correction unit that reduces the actual speed that is kept constant by the first control unit upon a condition that the actual speed that is kept constant by the first control unit input into the control status confirmation unit is equal to or greater than a predetermined threshold value NO, the opening degree of the inlet guide vane is equal to or greater than a predetermined threshold value □0, and an atmospheric temperature is equal to or less than a predetermined threshold value Ta0 are at least included,
wherein the 2-shaft gas turbine is configured of an inlet guide vane control device by which the opening degree of the inlet guide vane is capable of being changed; a fuel control valve that controls a fuel supply amount from a fuel supply source to the combustor; a fuel control unit that controls the fuel control valve using a rotational speed that is detected by a rotational speed detector disposed in the low pressure turbine shaft and operation load data that is obtained from a load; and an inlet guide vane opening degree control unit that is connected to the inlet guide vane control device and controls the opening degree of the inlet guide vane, and includes a gas generator control device that controls an operational status of the 2-shaft gas turbine, and
wherein upon a condition that the operational status is determined to be corrected by the control status confirmation unit, in the low atmospheric temperature correction unit, a correction coefficient □ is multiplied to an actual speed N of the gas generator and the opening degree of the inlet guide vane is controlled by sending a signal to the inlet guide vane control device so that the rotational speed is reduced to N'.

2. The 2-shaft gas turbine according to claim 1, wherein the inlet guide vane opening degree control unit includes the first control unit; the control status confirmation unit; the low atmospheric temperature correction unit; a second control unit that calculates a corrected speed using the rotational speed of the gas generator obtained by the rotational speed detector disposed in the high pressure turbine shaft and the atmospheric temperature, and adjusts the opening degree of the inlet guide vane such that a relationship between the corrected speed and the opening degree of the inlet guide vane is uniquely determined irrespective of the atmospheric temperature; an operational status determination unit that determines the operational status of the gas generator in a second operational status configured of actuation and stop status, and a low load operation status, and a first operation status configured of a high load operational status other than the second operational status; and a control selection unit that selects whether any one of the first control unit and the second control unit is used from a determination result of the operational status determination unit, and wherein after the determination of the operational status by the operational status determination unit and the control selection by the control selection unit are completed, the opening degree of the inlet guide vane is controlled through the control status confirmation unit and the low atmospheric temperature correction unit.

3. The 2-shaft gas turbine according to claim 1, wherein the predetermined threshold value N0 of the actual speed kept constant by the first control unit is a rotational speed Ndes during a rated operation defined at the time of design and the predetermined threshold value □0 of the opening degree of the inlet guide vane is an opening degree □des during the rated operation defined at the time of design.

4. The 2-shaft gas turbine according to claim 1, wherein the predetermined threshold value N0 of the actual speed kept constant by the first control unit and the predetermined threshold value □0 of the opening degree of the inlet guide vane are less than the rotational speed Ndes during the rated operation and the opening degree □des during the rated operation defined at the time of design.

5. The 2-shaft gas turbine according to claim 2, further comprising:
a third control unit that adjusts the opening degree of the inlet guide vane to be kept constant irrespective of the rotational speed of the high pressure turbine shaft upon transition from the control in the second control unit to the control in the first control unit.

6. The 2-shaft gas turbine according to claim 2, wherein the inlet guide vane opening degree control unit includes a low atmospheric temperature additional correction unit that increases the opening degree of the inlet guide vane upon a condition that the atmospheric temperature is equal to or less than the predetermined threshold value Ta0.

7. A control method of an inlet guide vane of a 2-shaft gas turbine including a gas generator that is configured of a compressor that has inlet guide vanes on an air intake side and compresses inflow air, a combustor that generates combustion gas by burning air that is compressed by the compressor and fuel, and a high pressure turbine driven by the combustion gas generated by the combustor; and a low pressure turbine that is driven by gas discharged from the high pressure turbine, in which a high pressure turbine shaft that connects the compressor to the high pressure turbine, and a low pressure turbine shaft that connects the low pressure turbine to a load are separated shafts, and an inflow air amount to the compressor is adjusted by controlling an opening degree of the inlet guide vane, wherein, in the control of the opening degree of the inlet guide vane, as a unit that controls the opening degree of the inlet guide vane, a first control unit; a control status confirmation unit, and a low atmospheric temperature correction unit are included, and in the first control unit, the opening degree of the inlet guide vane is adjusted so as to keep an actual speed of the high pressure turbine shaft constant during a high speed rotation of the high pressure turbine shaft; in the control status confirmation unit, the actual speed that is kept constant by the first control unit and the opening degree of the inlet guide vane are confirmed; and in the low atmospheric temperature correction unit, the opening degree of the inlet guide vane is controlled so as to reduce the actual speed that is kept constant by the first control unit upon a condition that the actual speed that is kept constant by the first control unit input into the control status confirmation unit is equal to or greater than a predetermined threshold value N0, the opening degree of the inlet guide vane is equal to or greater than a predetermined threshold value □0, and an atmospheric temperature is equal to or less than a predetermined threshold value Ta0, wherein the opening degree of the inlet guide vane is changed by the inlet guide vane control device; a fuel supply amount from a fuel supply source to the combustor is controlled by a fuel control valve; an operational status of the 2-shaft gas turbine is controlled by a gas generator control device configured of a fuel control unit that controls the fuel control valve using a rotational speed that is detected by a rotational speed detector disposed in the low pressure turbine shaft and operation load data that is obtained from the load, and an inlet guide vane opening degree control unit that is connected to the inlet guide vane control device and controls the opening degree of the inlet guide vane; a corrected speed is calculated by using the rotational speed of the gas generator obtained by the rotational speed detector disposed in the high pressure turbine shaft and the atmospheric temperature; the opening degree of the inlet guide vane is adjusted in a second control unit such that a relationship between the corrected speed and the opening degree of the inlet guide vane is uniquely determined irrespective of the atmospheric temperature; the operational status of the gas generator is determined by an operational status determination unit in a second operational status configured of actuation, stop status, and a low load operational status, and a first operational status configured of a high load operational status other than the second operational status; and whether any one of the first control unit and the second control unit is used is selected by a control selection unit from a determination result of the operational status determination unit, wherein after the determination of the operational status by the operational status determination unit and the control selection by the control selection unit are completed, the opening degree of the inlet guide vane is controlled through the control status confirmation unit and the low atmospheric temperature correction unit, wherein upon a condition that the operational status is determined to be corrected by the control status confirmation unit, in the low atmospheric temperature correction unit, a correction coefficient $\square$ is multiplied to an actual speed N of the gas generator and the opening degree of the inlet guide vane is controlled by sending a signal to the inlet guide vane control device so that the rotational speed is reduced to N'.

8. The control method of an inlet guide vane of a 2-shaft gas turbine according to claim 7, wherein the predetermined threshold value N0 of the actual speed kept constant by the first control unit is a rotational speed Ndes during a rated operation defined at the time of design and the predetermined threshold value $\square$0 of the opening degree of the inlet guide vane is an opening degree $\square$des during the rated operation defined at the time of design.

9. The control method of an inlet guide vane of a 2-shaft gas turbine according to claim 7, wherein the predetermined threshold value N0 of the actual speed kept constant by the first control unit and the predetermined threshold value $\square$0 of the opening degree of the inlet guide vane are less than the rotational speed Ndes during the rated operation and the opening degree $\square$des during the rated operation defined at the time of design.

10. The control method of an inlet guide vane of a 2-shaft gas turbine according to claim 7, wherein the predetermined threshold value N0 of the actual speed kept constant by the first control unit and the predetermined threshold value $\square$0 of the opening degree of the inlet guide vane are less than the rotational speed Ndes during the rated operation and the opening degree $\square$des during the rated operation defined at the time of design.

11. The control method of an inlet guide vane of a 2-shaft gas turbine according to claim 7, wherein the opening degree of the inlet guide vane is increased by a low atmospheric temperature additional correction unit upon a condition that the atmospheric temperature is equal to or less than the predetermined threshold value Ta0.

* * * * *